United States Patent
Tsai (10) Patent No.: US 10,065,458 B2
(45) Date of Patent: Sep. 4, 2018

(54) VEHICLE TIRE

(71) Applicant: Ching-Huang Tsai, Tainan (TW)

(72) Inventor: Ching-Huang Tsai, Tainan (TW)

( * ) Notice: Subject to any disclaimer, the term of this patent is extended or adjusted under 35 U.S.C. 154(b) by 311 days.

(21) Appl. No.: 14/995,233

(22) Filed: Jan. 14, 2016

(65) Prior Publication Data
US 2016/0214440 A1   Jul. 28, 2016

(30) Foreign Application Priority Data
Jan. 26, 2015 (TW) .............................. 104201226 U (51) Int. Cl.
| | | |
|---|---|---|
| *B60C 19/00* | (2006.01) | |
| *B60C 19/12* | (2006.01) | |
| *B60C 11/02* | (2006.01) | |
| *B60C 27/00* | (2006.01) | |
| *B60C 13/00* | (2006.01) | |
| *B60C 27/06* | (2006.01) | |

(52) U.S. Cl.
CPC .......... *B60C 19/125* (2013.01); *B60C 13/002* (2013.01); *B60C 19/00* (2013.01); *B60C 19/12* (2013.01); *B60C 27/06* (2013.01); *B60C 27/062* (2013.01)

(58) Field of Classification Search
CPC ......... B60C 11/02; B60C 19/00; B60C 19/12; B60C 27/00; B60C 27/06; B60C 27/062; B60C 27/065
See application file for complete search history.

(56) References Cited

U.S. PATENT DOCUMENTS

| | | | | |
|---|---|---|---|---|
| 3,815,651 A | * | 6/1974 | Neal | ................. B29D 30/3014 152/172 |
| 2013/0087258 A1 | | 4/2013 | Tsai | ............................. 152/187 |

FOREIGN PATENT DOCUMENTS

| | | | | |
|---|---|---|---|---|
| GB | 192604 | * | 2/1923 | |
| TW | 000139130 | | 8/1990 | ............. B60B 21/12 |

* cited by examiner

*Primary Examiner* — Justin R Fischer
(74) *Attorney, Agent, or Firm* — Alan D. Kamrath; Kamrath IP Lawfirm, P.A.

(57) ABSTRACT

A vehicle wheel includes a rim, an inflatable tire, a grounding tire, and a safety unit. The rim includes two tire engagement portions spaced from each other in a longitudinal direction. The inflatable tire is mounted around the rim and includes an inner annular bottom wall and two inner annular sidewalls respectively on left and right sides of the inner annular bottom wall. Each inner annular sidewall includes an inner side having a lip pressing against one of the tire engagement portions of the rim. The grounding tire is mounted around the inflatable tire and includes an outer annular bottom wall capable of rolling contact with the ground. The safety unit is sandwiched between the inflatable tire and the grounding tire to couple the inflatable tire and the grounding tire together, permitting synchronously rotation of the inflatable tire and the grounding tire while increasing the anti-slipping effect.

11 Claims, 9 Drawing Sheets

VEHICLE TIRE

CROSS REFERENCE TO RELATED APPLICATION

This application claims the benefit of Taiwan Patent Application No. 104201226 filed Jan. 26, 2015, the entire contents of which are incorporated herein by reference.

BACKGROUND OF THE INVENTION

The present invention relates to a vehicle tire and, more particularly, to a vehicle tire mounted to a bottom of a vehicle.

Figure 1:
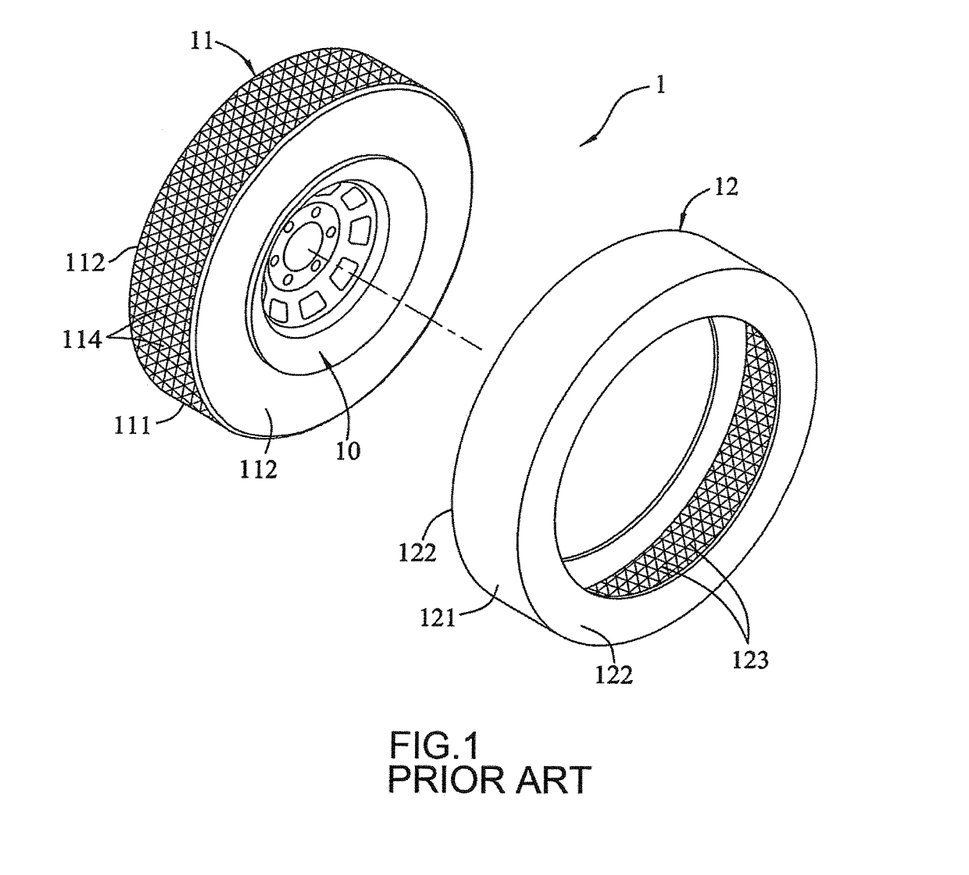
FIG. 1 is an exploded, perspective view of a conventional vehicle wheel.
Figure 2:
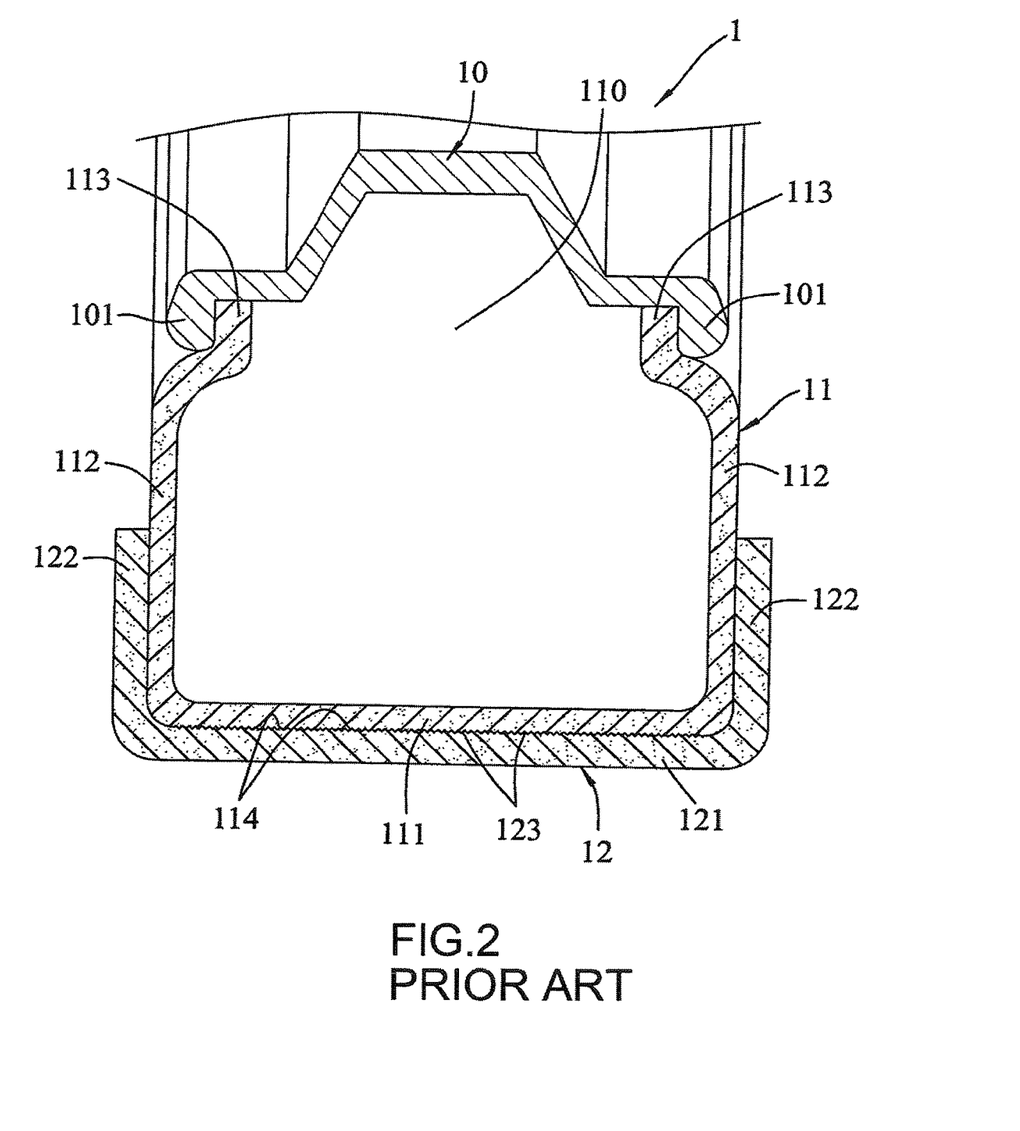
FIG. 2 is a partial, cross sectional view of the vehicle wheel of FIG. 1.

With reference to FIGS. 1 and 2, U.S. Patent Publication Application No. 20130087258 (a corresponding application of Taiwan Utility Model No. TW M434693 U1) discloses a vehicle tire 1 including a rim 10, an inner tire 11, and an outer tire 12. The rim 10 includes two tire engagement portions 101 located on two outer sides thereof and spaced from each other in the left/right direction (the longitudinal direction of the rim 10). The inner tire 11 is mounted around the rim 10 and defines an inflating space 110 together with the rim 10. The inner tire 11 is a hollow annular member which is U-shaped in radial cross section and which has an inwardly facing opening. The inner tire 11 includes an inner annular bottom wall 111 and two inner annular sidewalls 112 respectively extending inwards from left and right sides of the inner annular bottom wall 111. Each inner annular sidewall 112 includes an inner side having a lip 113 pressing against one of the two tire engagement portions 101 of the rim 10. The inner annular bottom wall 111 includes an outer peripheral face having a plurality of inner annular patterns 114.

The outer tire 12 is mounted around the inner tire 11 and is a hollow annular member which is U-shaped in radial cross section and which has an inwardly facing opening. The outer tire 12 includes an outer annular bottom wall 121 surrounding the inner annular bottom wall 111 of the inner tire 11 and capable of rolling contact with the ground. The outer tire 12 further includes two outer annular sidewalls 122 respectively located on left and right sides of the outer annular bottom wall 121 and partially covering the two inner annular sidewalls 112. The outer annular bottom wall 121 includes an inner peripheral face having a plurality of outer annular patterns 123 engaged with one of the inner annular patterns 114.

Although the vehicle tire 1 includes the outer tire 12 mounted around the inner tire 11 to reduce the possibility of wear of the inner tire 11 by increasing the overall thickness, both of the inner tire 11 and the outer tire 12 are made of soft rubber material, such that the engagement between the inner annular patterns 114 and the outer annular patterns 123 are not tight. Thus, the inner tire 11 and the outer tire 12 are apt to rotate relative to each other, resulting in slippage. Furthermore, the inner tire 11 directly abuts the inner periphery of the outer tire 12. In a case that a sharp article pierces through the outer tire 12 and further penetrates the inner tire 11 during driving, the inner tire 11 will leak air or burst and, thus, lose the supporting function, adversely affecting the driving safety. Thus, improvement to the design of the above vehicle tire 1 is still required.

Figure 3:
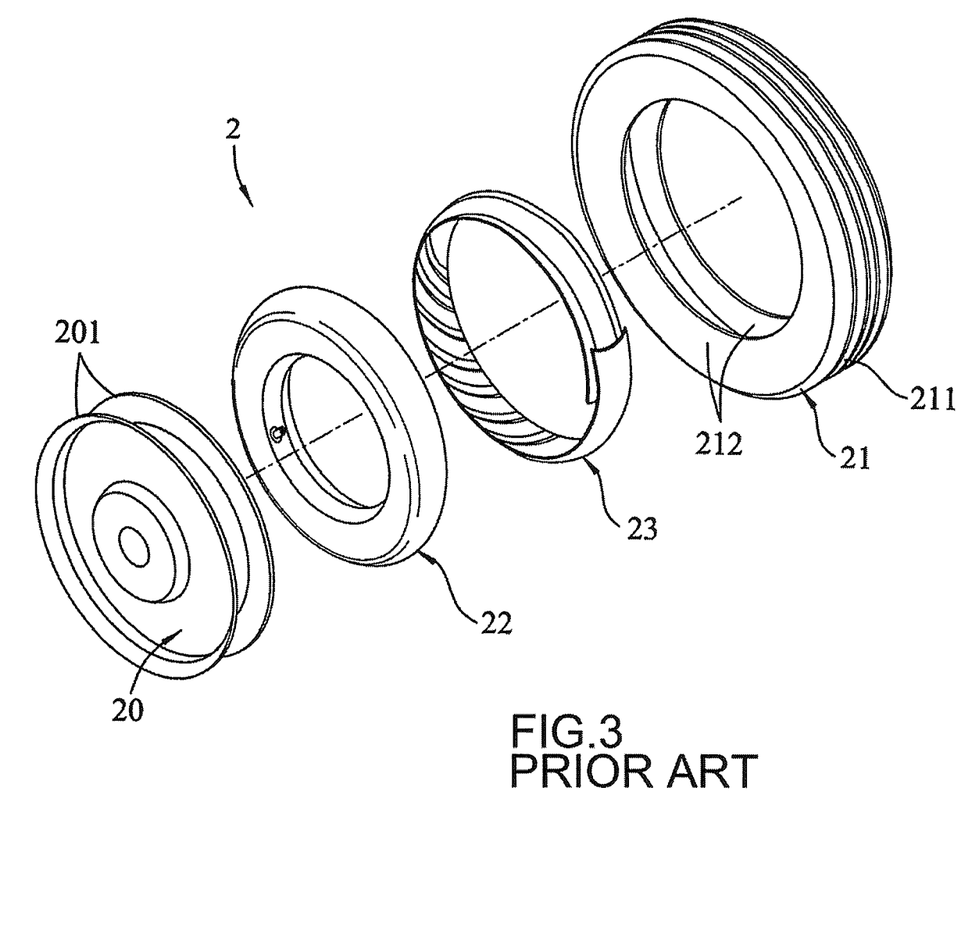
FIG. 3 is an exploded, perspective view of another conventional vehicle wheel.
Figure 4:
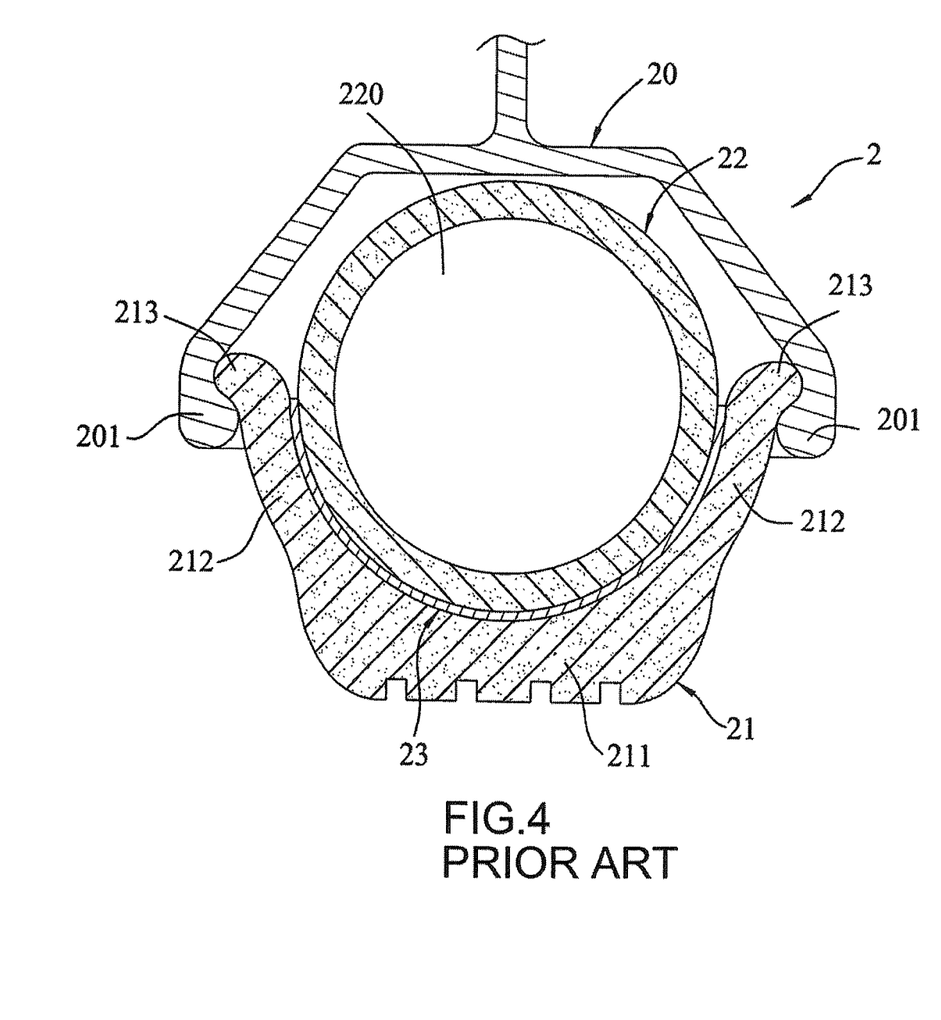
FIG. 4 is a partial, cross sectional view of the vehicle wheel of FIG. 3.

With reference to FIGS. 3 and 4, Taiwan Patent Publication No. 139130 discloses a vehicle wheel 2 including a rim 20, an outer tire 21, an inner tire 22, and an anti-piercing plate 23. The rim 20 includes two tire engagement portions 201 located on two outer sides thereof and spaced from each other in the left/right direction (the longitudinal direction of the rim 10). The outer tire 21 is mounted around the rim 20 and is a hollow annular member which is U-shaped in radial cross section and which has an inwardly facing opening. The outer tire 21 includes an outer annular bottom wall 211 capable of rolling contact with the ground. The outer tire 21 further includes two outer annular sidewalls 212 respectively extending inwards from left and right sides of the outer annular bottom wall 211. Each outer annular sidewall 212 includes an inner side having a lip 213 pressing against one of the tire engagement portions 201 of the rim 20. The inner tire 22 is mounted between the rim 20 and the outer tire 21. The inner tire 22 is a hollow annular member that is O-shaped in radial cross section and defines an inflation space 220. The anti-piercing plate 23 is sandwiched between the outer annular bottom wall 211 of the outer tire 21 and the inner tire 22.

Although the vehicle wheel 2 includes the anti-piercing plate 23 between the outer tire 21 and the inner tire 22 to avoid the inner tire 22 from being pierced by a sharp article, the shapes of the inner tire 22 and the outer tire 21 do not match with each other, such that the engagement between the inner tire 22 and the outer tire 21 is not tight. Thus, the inner tire 22 and the outer tire 21 are apt to rotate relative to each other, resulting in slippage. As a result, the design of the above vehicle wheel 2 is still not satisfactory.

BRIEF SUMMARY OF THE INVENTION

An objective of the present invention is to provide a vehicle wheel with both effects of preventing slippage and preventing piercing.

A vehicle wheel according to the present invention includes a rim, an inflatable tire, a grounding tire, and a safety unit. The rim includes two tire engagement portions respectively on two outer sides thereof and spaced from each other in a longitudinal direction. The inflatable tire is mounted around the rim and is a hollow annular member which is U-shaped in radial cross section and which has an inwardly facing opening. The inflatable tire includes an inner annular bottom wall surrounding the rim. The inflatable tire further includes two inner annular sidewalls respectively extending radially inwards from left and right sides of the inner annular bottom wall towards the rim. Each of the two inner annular sidewalls includes an inner side having a lip pressing against one of the two tire engagement portions of the rim. The grounding tire is mounted around the inflatable tire and is a hollow annular member which is U-shaped in radial cross section and which has an inwardly facing opening. The grounding tire includes an outer annular bottom wall surrounding the inner annular bottom wall of the inflatable tire and capable of rolling contact with the ground. The grounding tire further includes two outer annular sidewalls respectively extending radially inwards from left and right sides of the outer annular bottom wall and respectively located beside the two inner annular sidewalls of the inflatable tire. The safety unit is sandwiched between the inflatable tire and the grounding tire to couple the inflatable tire and the grounding tire together, permitting synchronously rotation of the inflatable tire and the grounding tire.

In an example, the safety unit includes a first lining plate sandwiched between the inner annular bottom wall of the inflatable tire and the outer annular bottom wall of the grounding tire. The first lining plate is constructed by an elongated plate coiled to form an annular shape. The first lining plate has two ends detachably coupled to each other.

The inner annular bottom wall of the inflatable tire can include an outer peripheral face having a plurality of first inner annular patterns. The outer annular bottom wall of the grounding tire can include an inner peripheral face having a plurality of first outer annular patterns. The first lining plate can include a first side facing the inner annular bottom wall of the inflatable tire and having a plurality of second inner annular patterns engaged with the plurality of first inner annular patterns of the inflatable tire. The first lining plate can further include a second side facing the outer annular bottom wall of the grounding tire and having a plurality of second outer annular patterns engaged with the plurality of first outer annular patterns of the grounding tire.

The safety unit can further include two second lining plates spaced from each other in the longitudinal direction. Each of the two second lining plates is sandwiched between one of the two inner annular sidewalls of the inflatable tire and one of the two outer annular sidewalls of the grounding tire. Each of the two second lining plates is constructed by an elongated plate coiled to form an annular shape. Each of the two second lining plates has two ends detachably coupled to each other.

Each of the two inner annular sidewalls of the inflatable tire can include an outer surface having a plurality of first inner side patterns. Each of the two outer annular sidewalls of the grounding tire can include an inner surface having a plurality of first outer side patterns. Each of the two second lining plates can include a first side facing one of the two inner annular sidewalls of the inflatable tire and having a plurality of second inner side patterns engaged with the plurality of first inner side patterns of the one of the two inner annular sidewalls of the inflatable tire. Each of the two second lining plates can further include a second side facing one of the two outer annular sidewalls of the grounding tire and having a plurality of second outer side patterns engaged with the plurality of first outer side patterns of the one of the two outer annular sidewalls of the grounding tire.

In another example, the safety unit includes a plurality of first lining plates sandwiched between the inner annular bottom wall of the inflatable tire and the outer annular bottom wall of the grounding tire. Each of the plurality of first lining plates is an arcuate plate having two ends. The plurality of first lining plates is connected to each other to form an annular shape. Each of the two ends of each of the plurality of first lining plates is detachably coupled to one of the two ends of an adjacent first lining plate.

The inner annular bottom wall of the inflatable tire can include an outer peripheral face having a plurality of first inner annular patterns. The outer annular bottom wall of the grounding tire can include an inner peripheral face having a plurality of first outer annular patterns. Each of the plurality of first lining plates can include a first side facing the inner annular bottom wall of the inflatable tire and having a plurality of second inner annular patterns engaged with the plurality of first inner annular patterns of the inflatable tire. Each of the plurality of first lining plates can further include a second side facing the outer annular bottom wall of the grounding tire and having a plurality of second outer annular patterns engaged with the plurality of first outer annular patterns of the grounding tire.

The safety unit can further include a plurality of second lining plates disposed on each of left and right sides of the rim. The plurality of second lining plates on the left side of the rim is spaced from the plurality of second lining plates on the right side of the rim in the longitudinal direction. The plurality of second lining plates on the left side of the rim is sandwiched between one of the two inner annular sidewalls of the inflatable tire and one of the two outer annular sidewalls of the grounding tire. The plurality of second lining plates on the right side of the rim is sandwiched between the other of the two inner annular sidewalls of the inflatable tire and the other of the two outer annular sidewalls of the grounding tire. The plurality of second lining plates on the same side of the rim is connected to each other to form an annular shape. Each of the plurality of second lining plates on the same side of the rim is arcuate and has two ends. Each of the two ends of each of the plurality of second lining plates on the same side of the rim is detachably coupled to one of the two ends of an adjacent second lining plate on the same side of the rim.

Each of the two inner annular sidewalls of the inflatable tire can include an outer surface having a plurality of first inner side patterns. Each of the two outer annular sidewalls of the grounding tire can include an inner surface having a plurality of first outer side patterns. Each of the plurality of second lining plates can include a first side facing one of the two inner annular sidewalls of the inflatable tire and having a plurality of second inner side patterns engaged with the plurality of first inner side patterns of the one of the two inner annular sidewalls of the inflatable tire. Each of the plurality of second lining plates can further include a second side facing one of the two outer annular sidewalls of the grounding tire and having a plurality of second outer side patterns engaged with the plurality of first outer side patterns of the one of the two outer annular sidewalls of the grounding tire.

The inflatable tire can include a rubber layer and a steel wire layer embedded in the rubber layer.

The present invention will become clearer in light of the following detailed description of illustrative embodiments of this invention described in connection with the drawings.

DETAILED DESCRIPTION OF THE INVENTION

Before a detailed description of the present invention is set forth, it is noted that like elements are designated by like reference numbers in the description hereinbelow.

Figure 5:
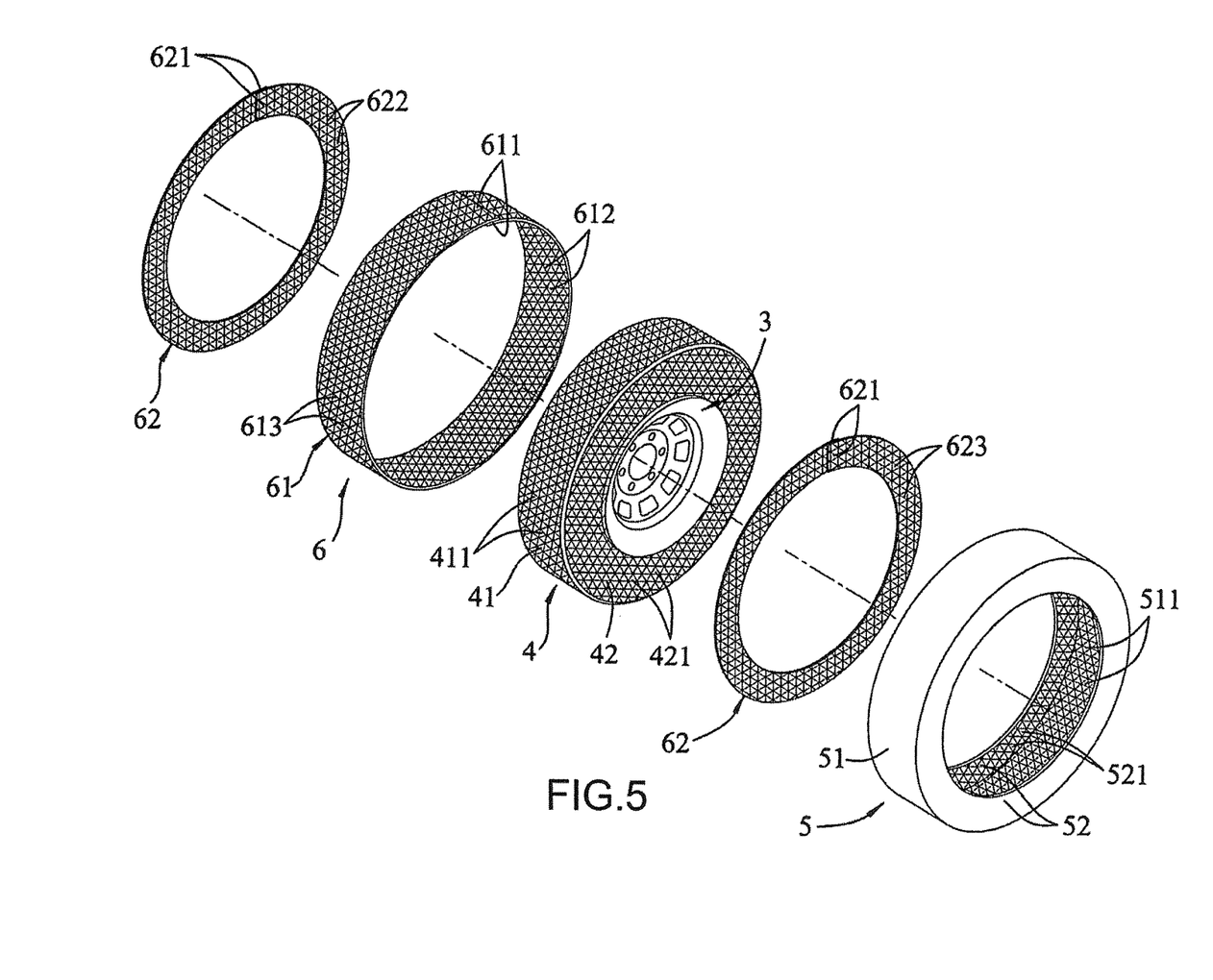
FIG. 5 is an exploded, perspective view of a vehicle wheel of a first example according to the present invention.
Figure 6:
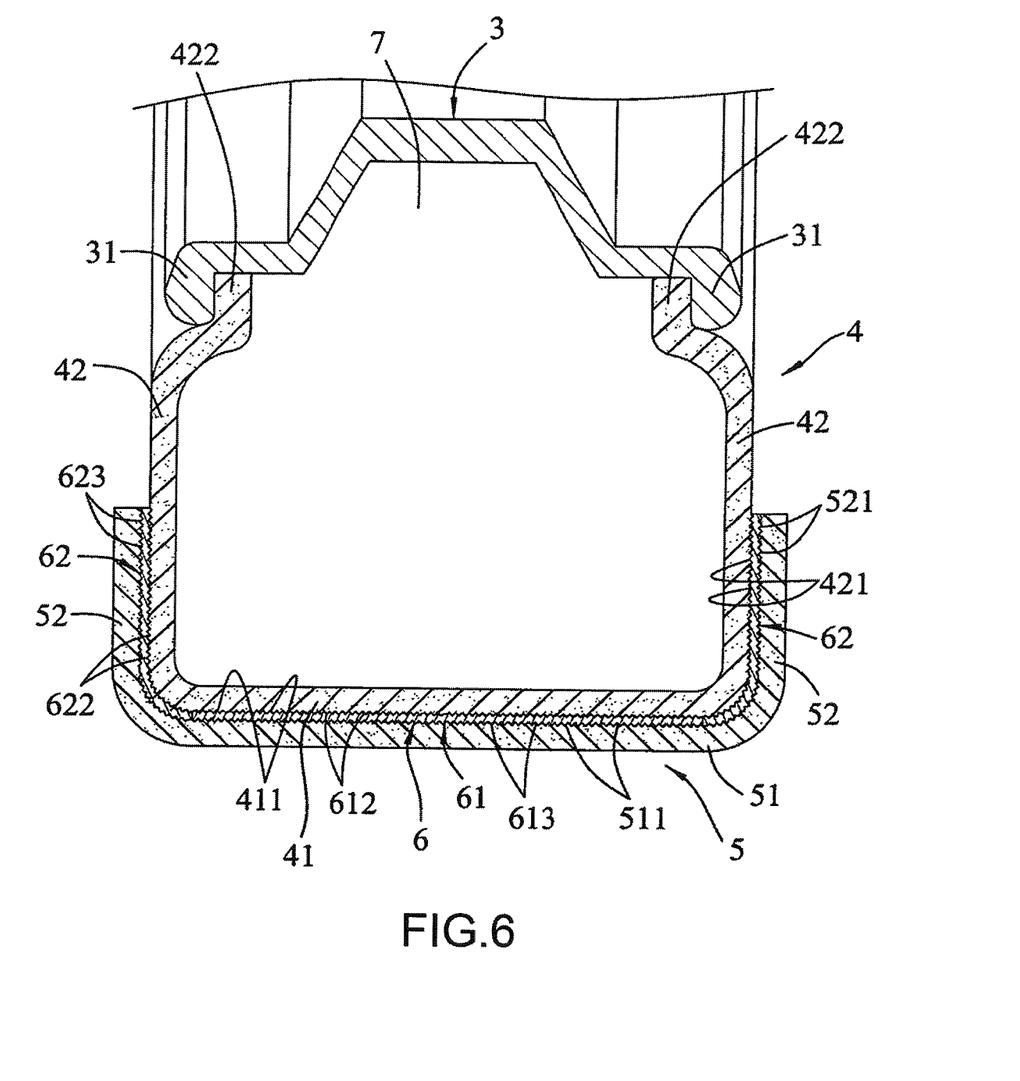
FIG. 6 is a partial, cross sectional view of the vehicle wheel of FIG. 5.

With reference to FIGS. 5 and 6, a vehicle wheel of a first example according to the present invention can be mounted to a bottom of a vehicle (not shown), such as a car, a motorcycle, or a bicycle. The vehicle wheel includes a rim 3, an inflatable tire 4, a grounding tire 5, and a safety unit 6.

The rim 3 is made of metal and includes two tire engagement portions 31 respectively on two outer sides thereof and spaced from each other in a left/right direction (a longitudinal direction). Detailed description of the rim 3 is not set forth, because the structure and the shape of the rim 3 are of a currently available type, are not the features of the present invention, and can be modified when embodied.

The inflatable tire 4 is made of rubber material and is a hollow annular member which is U-shaped in radial cross section and which has an inwardly facing opening. The inflatable tire 4 is mounted around the rim 3 and defines an inflation space 7 together with the rim 3. The inflatable tire 4 includes an inner annular bottom wall 41 surrounding the rim 3. The inflatable tire 4 further includes two inner annular sidewalls 42 respectively extending radially inwards from left and right sides of the inner annular bottom wall 41 towards the rim 3. The inner annular bottom wall 41 includes an outer peripheral face having a plurality of first inner annular patterns 411. Each of the two inner annular sidewalls 42 includes an outer surface having a plurality of first inner side patterns 421. Each of the two inner annular sidewalls 42 includes an inner side having a lip 422 pressing against one of the two tire engagement portions 31 of the rim 3.

The grounding tire 5 is also made of rubber material. The grounding tire 5 is a hollow annular member which is U-shaped in radial cross section and which has an inwardly facing opening. The grounding tire 5 is mounted around the inflatable tire 4. The grounding tire 5 includes an outer annular bottom wall 51 surrounding the inner annular bottom wall 41 of the inflatable tire 4 and capable of rolling contact with the ground. The grounding tire 5 further includes two outer annular sidewalls 52 respectively extending radially inwards from left and right sides of the outer annular bottom wall 51 and respectively located beside and partially covering the two inner annular sidewalls 42 of the inflatable tire 4. The outer annular bottom wall 51 includes an inner peripheral face having a plurality of first outer annular patterns 511. Each of the two outer annular sidewalls 52 includes an inner surface having a plurality of first outer side patterns 521. It is noted that an outer peripheral face of the outer annular bottom wall 51 includes a plurality of spaced protruded patterns (not shown) or recessed patterns (not shown) to increase the ground-gripping and anti-slipping effect or a wear alarm effect, which is not further described herein.

The safety unit 6 is sandwiched between the inflatable tire 4 and the grounding tire 5. The safety unit 6 includes a first lining plate 61 and two second lining plates 62 spaced from each other in the longitudinal direction. The first lining plate 61 is sandwiched between the inner annular bottom wall 41 of the inflatable tire 4 and the outer annular bottom wall 51 of the grounding tire 5. The first lining plate 61 is constructed by an elongated plate coiled to form an annular shape. The first lining plate 61 has two ends detachably coupled to each other.

The first lining plate 61 further includes a first side facing the inner annular bottom wall 41 of the inflatable tire 4 and having a plurality of second inner annular patterns 612 engaged with the first inner annular patterns 411 of the inflatable tire 4. The first lining plate 61 further includes a second side facing the outer annular bottom wall 51 of the grounding tire 5 and having a plurality of second outer annular patterns 613 engaged with the first outer annular patterns 511 of the grounding tire 5.

Each of the two second lining plates 62 is sandwiched between one of the two inner annular sidewalls 42 of the inflatable tire 4 and one of the two outer annular sidewalls 52 of the grounding tire 5. Each of the two second lining plates 62 is constructed by an elongated plate coiled to form an annular shape. Each of the two second lining plates 62 has two ends 621 detachably coupled to each other. Each of the two second lining plates 62 further includes a first side facing one of the two inner annular sidewalls 42 of the inflatable tire 4 and having a plurality of second inner side patterns 622 engaged with the first inner side patterns 421 of the one of the two inner annular sidewalls 42 of the inflatable tire 4. Each of the two second lining plates 62 further includes a second side facing one of the two outer annular sidewalls 52 of the grounding tire 5 and having a plurality of second outer side patterns 623 engaged with the first outer side patterns 521 of the one of the two outer annular sidewalls 52 of the grounding tire 5.

The first lining plate 61 and the second lining plates 62 of the safety unit 6 are made of flexible material, such as steel plates, rigid rubber, fiber glass, etc. Thus, the safety unit 6 can be contracted or expanded according to the size before mounting into the inflatable tire 4 and the grounding tire 5. Furthermore, the safety unit 6 can bend and extend to comply with the curvatures of the inflatable tire 4 and the grounding tire 5. Furthermore, the safety unit 6 can elastically expand outwards responsive to the outline of the inflatable tire 4 during inflation. Furthermore, the inflatable tire 4 and the grounding tire 5 are made of soft rubber material, and the safety unit 6 is made of rigid metal or rigid non-metal material. Therefore, the engagement between the safety unit 6 and each of the inflatable tire 4 and the grounding tire 5 (i.e., the engagement between the first inner annular patterns 411 and the second inner annular patterns 612, the engagement between the first outer annular patterns 511 and the second outer annular patterns 613, the engagement between the first inner side patterns 421 and the second inner side patterns 622, and the engagement between the first outer side patterns 521 and the second outer side patterns 623) will be tighter, such that the inflatable tire 4 and the grounding tire 5 are coupled together to permit synchronous rotation of the inflatable tire 4 and the grounding tire 5 without relative rotation therebetween while avoiding slippage. Furthermore, the first lining plate 61 and the second lining plates 62 provide an anti-piercing effect and are less likely to be pierced by sharp articles. Thus, if a sharp article penetrates inwards through the grounding tire 5, the safety unit 6 provides a protection effect to avoid the sharp article from contacting with the inflatable tire 4, achieving a safety effect of protecting the inflatable tire 4.

Figure 7:
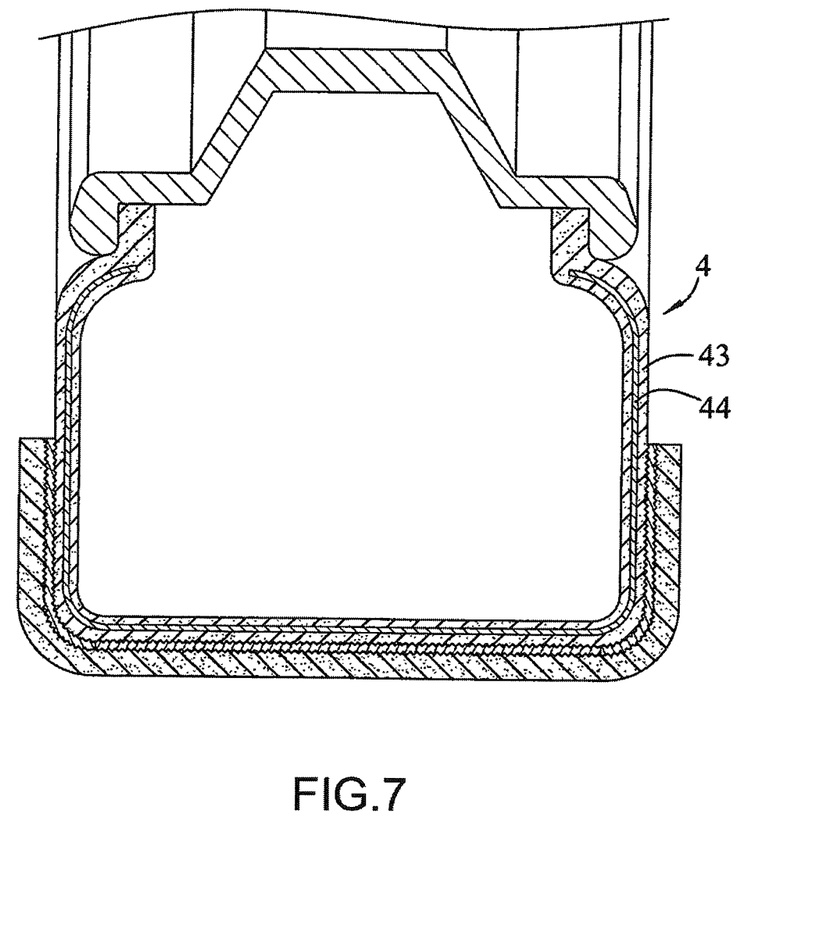
FIG. 7 is a partial, cross sectional view of a vehicle wheel of a second example according to the present invention.

FIG. 7 shows a second example of the present invention which is substantially identical to the first example except that the inflatable tire 4 includes a rubber layer 43 and a steel wire layer 44 embedded in the rubber layer 43. The inflatable tire 4 can have a multi-layer structure to serve as an anti-burst tire or a high-speed tire. Thus, the structure of the inflatable tire 4 is not limited to the second example.

Figure 8:
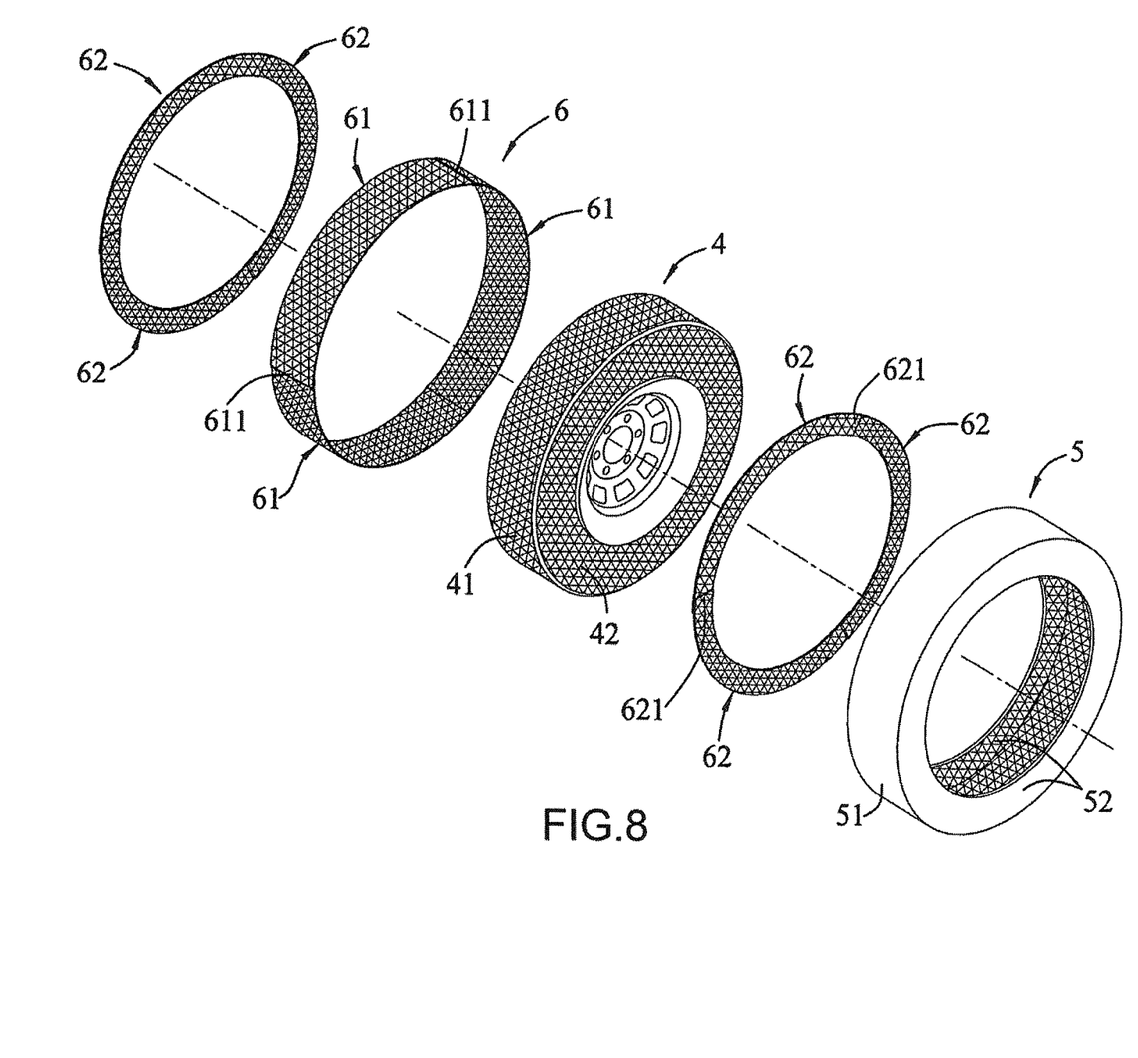
FIG. 8 is an exploded, perspective view of a vehicle wheel of a third example according to the present invention.
Figure 9:
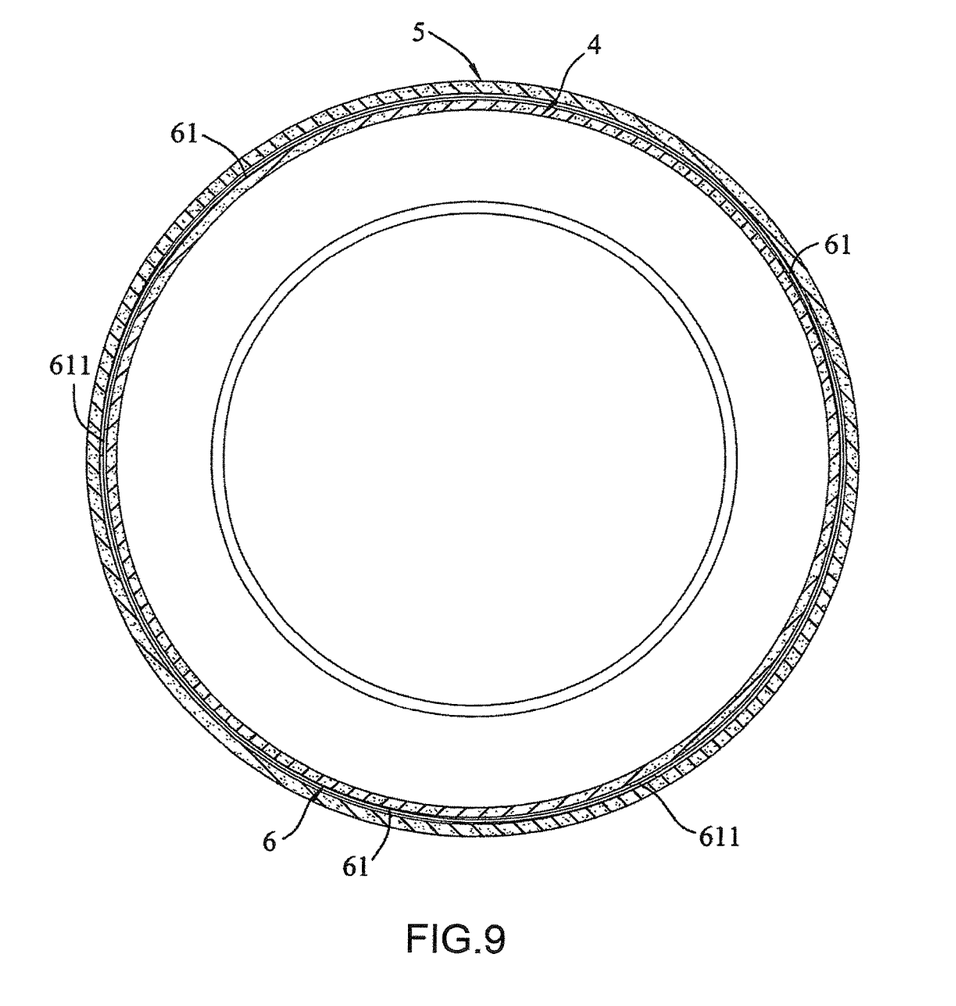
FIG. 9 is a cross sectional view of a vehicle wheel of FIG. 8 with a rim of the vehicle wheel removed.

FIGS. 8 and 9 show a third example of the present invention which is substantially identical to the first example except the safety unit 6. Specifically, the safety unit 6 includes a plurality of first lining plates 61 sandwiched between the inner annular bottom wall 41 of the inflatable tire 4 and the outer annular bottom wall 51 of the grounding tire 5. Each first lining plate 61 is an arcuate plate having two ends 611. The first lining plates 61 are connected to each other to form an annular shape. Each of the two ends 611 of each first lining plate 61 is detachably coupled to one of the two ends 611 of an adjacent first lining plate 61.

Each first lining plate 61 includes a first side facing the inner annular bottom wall 41 of the inflatable tire 4 and having a plurality of second inner annular patterns 612 engaged with the first inner annular patterns 411 of the inflatable tire 4. Each first lining plate 61 further includes a second side facing the outer annular bottom wall 51 of the grounding tire 5 and having a plurality of second outer annular patterns 613 engaged with the first outer annular patterns 511 of the grounding tire 5.

Furthermore, the safety unit 6 of the third example includes a plurality of second lining plates 62 disposed on each of left and right sides of the rim 3. The second lining plates 62 on the left side of the rim 3 are spaced from the second lining plates 62 on the right side of the rim 3 in the longitudinal direction. The second lining plates 62 on the left side of the rim 3 are sandwiched between one of the two inner annular sidewalls 42 of the inflatable tire 4 and one of the two outer annular sidewalls 52 of the grounding tire 5. The second lining plates 62 on the right side of the rim 3 are sandwiched between the other of the two inner annular sidewalls 42 of the inflatable tire 4 and the other of the two outer annular sidewalls 52 of the grounding tire 5. The second lining plates 62 on the same side of the rim 3 are connected to each other to form an annular shape. Each of second lining plate 62 on the same side of the rim 3 is arcuate and has two ends 621. Each of the two ends 621 of each second lining plate 62 on the same side of the rim 3 is detachably coupled to one of the two ends 621 of an adjacent second lining plate 62 on the same side of the rim 3.

Each second lining plate 62 includes a first side facing one of the two inner annular sidewalls 42 of the inflatable tire 4 and having a plurality of second inner side patterns 622 engaged with the first inner side patterns 421 of the one of the two inner annular sidewalls 42 of the inflatable tire 4. Each second lining plate 62 further includes a second side facing one of the two outer annular sidewalls 52 of the grounding tire 5 and having a plurality of second outer side patterns 623 engaged with the first outer side patterns 521 of the one of the two outer annular sidewalls 52 of the grounding tire 5.

The vehicle wheel of the third example provides the first lining plates 61 and the second lining plates 62 to permit easy installation between the inflatable tire 4 and the grounding tire 5.

In view of the foregoing, the vehicle wheel according to the present invention provides the safety unit 6 sandwiched between the inflatable tire 4 and the grounding tire 5 to serve as a protective padding member surrounding the inflatable tire 4, which not only avoids the inflatable tire 4 from being pierced by a sharp article but increases the engaging force between the inflatable tire 4 and the grounding tire 5, avoiding slippage while permitting synchronous rotation of the grounding tire 5 and the inflatable tire 4. Accordingly, the present invention achieves a better effect of anti-piercing and anti-slippage to increase the driving safety.

Although specific embodiments have been illustrated and described, numerous modifications and variations are still possible without departing from the scope of the invention. The scope of the invention is limited by the accompanying claims.

The invention claimed is:

1. A vehicle wheel comprising:
   a rim including two tire engagement portions respectively on two outer sides thereof and spaced from each other in a longitudinal direction;
   an inflatable tire mounted around the rim, with the inflatable tire being a hollow annular member which is U-shaped in radial cross section and which has an inwardly facing opening, with the inflatable tire including an inner annular bottom wall surrounding the rim and having left and right sides, with the inflatable tire further including two inner annular sidewalls respectively extending radially inwards from the left and right sides of the inner annular bottom wall towards the rim, and with each of the two inner annular sidewalls including an inner side having a lip pressing against one of the two tire engagement portions of the rim, with the inner annular bottom wall of the inflatable tire including an outer peripheral face having a plurality of first inner annular patterns, with the outer annular bottom wall of the grounding tire including an inner peripheral face having a plurality of first outer annular patterns;
   a grounding tire mounted around the inflatable tire, with the grounding tire being a hollow annular member which is U-shaped in radial cross section and which has an inwardly facing opening, with the grounding tire including an outer annular bottom wall surrounding the inner annular bottom wall of the inflatable tire and capable of in rolling contact with a ground, with the outer annular bottom wall having left and right sides, and with the grounding tire further including two outer annular sidewalls respectively extending radially inwards from the left and right sides of the outer annular bottom wall and respectively located beside the two inner annular sidewalls of the inflatable tire; and
   a safety unit sandwiched between the inflatable tire and the grounding tire to couple the inflatable tire and the grounding tire together, permitting synchronously rotation of the inflatable tire and the grounding tire, with the safety unit including a first lining plate sandwiched between the inner annular bottom wall of the inflatable tire and the outer annular bottom wall of the grounding tire, with the first lining plate constructed by an elongated plate coiled to form an annular shape, with the first lining plate having two ends detachably coupled to each other, with the first lining plate including a first side facing the inner annular bottom wall of the inflatable tire and having a plurality of second inner annular patterns engaged with the plurality of first inner annular patterns of the inflatable tire, and with the first lining plate further including a second side facing the outer annular bottom wall of the grounding tire and having a plurality of second outer annular patterns engaged with the plurality of first outer annular patterns of the grounding tire.

2. The vehicle wheel as claimed in claim 1, with the safety unit further including two second lining plates spaced from each other in the longitudinal direction, with each of the two second lining plates sandwiched between one of the two inner annular sidewalls of the inflatable tire and one of the two outer annular sidewalls of the grounding tire, with each of the two second lining plates constructed by an elongated plate coiled to form an annular shape, and with each of the two second lining plates having two ends detachably coupled to each other.

3. The vehicle wheel as claimed in claim 2, with each of the two inner annular sidewalls of the inflatable tire including an outer surface having a plurality of first inner side patterns, with each of the two outer annular sidewalls of the grounding tire including an inner surface having a plurality of first outer side patterns, with each of the two second lining plates including a first side facing one of the two inner annular sidewalls of the inflatable tire and having a plurality of second inner side patterns engaged with the plurality of first inner side patterns of the one of the two inner annular sidewalls of the inflatable tire, and with each of the two second lining plates further including a second side facing one of the two outer annular sidewalls of the grounding tire and having a plurality of second outer side patterns engaged with the plurality of first outer side patterns of the one of the two outer annular sidewalls of the grounding tire.

4. The vehicle wheel as claimed in claim 1, wherein the inflatable tire includes a rubber layer and a steel wire layer embedded in the rubber layer.

5. A vehicle wheel comprising:
a rim including two tire engagement portions respectively on two outer sides thereof and spaced from each other in a longitudinal direction;
an inflatable tire mounted around the rim, with the inflatable tire being a hollow annular member which is U-shaped in radial cross section and which has an inwardly facing opening, with the inflatable tire including an inner annular bottom wall surrounding the rim and having left and right sides, with the inflatable tire further including two inner annular sidewalls respectively extending radially inwards from the left and right sides of the inner annular bottom wall towards the rim, and with each of the two inner annular sidewalls including an inner side having a lip pressing against one of the two tire engagement portions of the rim;
a grounding tire mounted around the inflatable tire, with the grounding tire being a hollow annular member which is U-shaped in radial cross section and which has an inwardly facing opening, with the grounding tire including an outer annular bottom wall surrounding the inner annular bottom wall of the inflatable tire and capable of in rolling contact with a ground, with the outer annular bottom wall having left and right sides, and with the grounding tire further including two outer annular sidewalls respectively extending radially inwards from the left and right sides of the outer annular bottom wall and respectively located beside the two inner annular sidewalls of the inflatable tire; and
a safety unit sandwiched between the inflatable tire and the grounding tire to couple the inflatable tire and the grounding tire together, permitting synchronously rotation of the inflatable tire and the grounding tire, with the safety unit including a first lining plate sandwiched between the inner annular bottom wall of the inflatable tire and the outer annular bottom wall of the grounding tire, with the first lining plate constructed by an elongated plate coiled to form an annular shape, with the first lining plate having two ends detachably coupled to each other, with the safety unit further including two second lining plates spaced from each other in the longitudinal direction, with each of the two second lining plates sandwiched between one of the two inner annular sidewalls of the inflatable tire and one of the two outer annular sidewalls of the grounding tire, with each of the two second lining plates constructed by an elongated plate coiled to form an annular shape, and with each of the two second lining plates having two ends detachably coupled to each other.

6. The vehicle wheel as claimed in claim 5, with each of the two inner annular sidewalls of the inflatable tire including an outer surface having a plurality of first inner side patterns, with each of the two outer annular sidewalls of the grounding tire including an inner surface having a plurality of first outer side patterns, with each of the two second lining plates including a first side facing one of the two inner annular sidewalls of the inflatable tire and having a plurality of second inner side patterns engaged with the plurality of first inner side patterns of the one of the two inner annular sidewalls of the inflatable tire, and with each of the two second lining plates further including a second side facing one of the two outer annular sidewalls of the grounding tire and having a plurality of second outer side patterns engaged with the plurality of first outer side patterns of the one of the two outer annular sidewalls of the grounding tire.

7. The vehicle wheel as claimed in claim 5, wherein the inflatable tire includes a rubber layer and a steel wire layer embedded in the rubber layer.

8. A vehicle wheel comprising:
a rim including two tire engagement portions respectively on two outer sides thereof and spaced from each other in a longitudinal direction;
an inflatable tire mounted around the rim, with the inflatable tire being a hollow annular member which is U-shaped in radial cross section and which has an inwardly facing opening, with the inflatable tire including an inner annular bottom wall surrounding the rim and having left and right sides, with the inflatable tire further including two inner annular sidewalls respectively extending radially inwards from the left and right sides of the inner annular bottom wall towards the rim, and with each of the two inner annular sidewalls including an inner side having a lip pressing against one of the two tire engagement portions of the rim, with the inner annular bottom wall of the inflatable tire including an outer peripheral face having a plurality of first inner annular patterns, with the outer annular bottom wall of the grounding tire including an inner peripheral face having a plurality of first outer annular patterns;
a grounding tire mounted around the inflatable tire, with the grounding tire being a hollow annular member which is U-shaped in radial cross section and which has an inwardly facing opening, with the grounding tire including an outer annular bottom wall surrounding the inner annular bottom wall of the inflatable tire and capable of in rolling contact with a ground, with the outer annular bottom wall having left and right sides, and with the grounding tire further including two outer annular sidewalls respectively extending radially inwards from the left and right sides of the outer annular bottom wall and respectively located beside the two inner annular sidewalls of the inflatable tire; and
a safety unit sandwiched between the inflatable tire and the grounding tire to couple the inflatable tire and the grounding tire together, permitting synchronously rotation of the inflatable tire and the grounding tire, with the safety unit including a plurality of first lining plates sandwiched between the inner annular bottom wall of the inflatable tire and the outer annular bottom wall of the grounding tire, with each of the plurality of first lining plates being an arcuate plate having two ends, with the plurality of first lining plates connected to each other to form an annular shape, with each of the two ends of each of the plurality of first lining plates detachably coupled to one of the two ends of an adjacent first lining plate, with each of the plurality of first lining plates including a first side facing the inner annular bottom wall of the inflatable tire and having a plurality of second inner annular patterns engaged with the plurality of first inner annular patterns of the inflatable tire, and with each of the plurality of first lining plates further including a second side facing the outer annular bottom wall of the grounding tire and having a plurality of second outer annular patterns engaged with the plurality of first outer annular patterns of the grounding tire.

9. The vehicle wheel as claimed in claim 8, with the safety unit further including a plurality of second lining plates disposed on each of left and right sides of the rim, with the plurality of second lining plates on the left side of the rim spaced from the plurality of second lining plates on the right side of the rim in the longitudinal direction, with the plurality of second lining plates on the left side of the rim sandwiched between one of the two inner annular sidewalls of the inflatable tire and one of the two outer annular sidewalls of the grounding tire, with the plurality of second lining plates on the right side of the rim sandwiched between another of the two inner annular sidewalls of the inflatable tire and another of the two outer annular sidewalls of the grounding tire, with the plurality of second lining plates on a same side of the rim connected to each other to form an annular shape, with each of the plurality of second lining plates on the same side of the rim being arcuate and having two ends, and with each of the two ends of each of the plurality of second lining plates on the same side of the rim detachably coupled to one of the two ends of an adjacent second lining plate on the same side of the rim.

10. The vehicle wheel as claimed in claim 9, with each of the two inner annular sidewalls of the inflatable tire including an outer surface having a plurality of first inner side patterns, with each of the two outer annular sidewalls of the grounding tire including an inner surface having a plurality of first outer side patterns, with each of the plurality of second lining plates including a first side facing one of the two inner annular sidewalls of the inflatable tire and having a plurality of second inner side patterns engaged with the plurality of first inner side patterns of the one of the two inner annular sidewalls of the inflatable tire, and with each of the plurality of second lining plates further including a second side facing one of the two outer annular sidewalls of the grounding tire and having a plurality of second outer side patterns engaged with the plurality of first outer side patterns of the one of the two outer annular sidewalls of the grounding tire.

11. The vehicle wheel as claimed in claim 8, wherein the inflatable tire includes a rubber layer and a steel wire layer embedded in the rubber layer.

* * * * *